Aug. 22, 1961 J. G. CONSAUL ET AL 2,997,392

METHOD OF GRAVURE REPRODUCTION

Filed Dec. 19, 1957 3 Sheets-Sheet 1

INVENTORS.
JOHN G. CONSAUL.
BY EDWIN VELTEN.

Ward, Neal, Haselton, Orme & McElhannon
ATTORNEYS.

INVENTORS:
JOHN G. CONSAUL
EDWIN VELTEN

*INVENTORS:*
JOHN G. CONSAUL
EDWIN VELTEN

United States Patent Office 2,997,392

Patented Aug. 22, 1961

2,997,392

METHOD OF GRAVURE REPRODUCTION

John G. Consaul, Bayonne, and Edwin Veltin, Gladstone, N.J., assignors to Art Color Printing Company, New York, N.Y., a corporation of New York Filed Dec. 19, 1957, Ser. No. 703,830
8 Claims. (Cl. 96—36)

This invention relates to a method of gravure reproduction and, more particularly, to a method of eliminating many operations now necssary in the handling and use of materials to make a resist to be transferred onto the copper plate or cylinder in the making of monotone and color gravure.

In all methods now in use, a tone positive must be made from the subject or copy. A screen formation then must be introduced in various ways, depending on which gravure method is used, such as conventional, Dultgen, Gresham, Alco, or Hard Dot. The positives then must be mounted to register. Registered positives are now printed in contact frame onto a resist. Said resist is then transferred onto a cylinder or plate, and the latter is developed and etched in the usual method.

In the instant method, the copy or subject is photographed directly on a gravure resist film that is properly lugged in the vacuum back of the gravure camera. If a retouched transparent positive is supplied, it is mounted on the lugs of a positive holder in front of the lens and photographed directly onto the resist in the same way.

The resist employed is a film that has lug-holes punched in one marginal edge, which holes fit on correspondingly spaced lugs in the vacuum back of the camera as well as on the lugs of the cylinder or plate. This eliminates the usual mounting previously used and permits the resist to be transferred in register directly from the camera to the printing cylinder or plate.

The mounting of all former methods is a time-consuming operation that requires a high degree of skill. The instant method, while preserving the advantages of our former method, disclosed in our pending application Serial No. 524,458 with respect to increased tonal range, by eliminating all previous mounting, effects a marked economy in time and labor. It also eliminates the usual carbon printing in the contact frame of tone positive and introduced screen onto the resist as used in the above-mentioned prior methods.

Other objects and advantages will appear from the following description of the invention. In the accompanying drawings.

Figure 1:
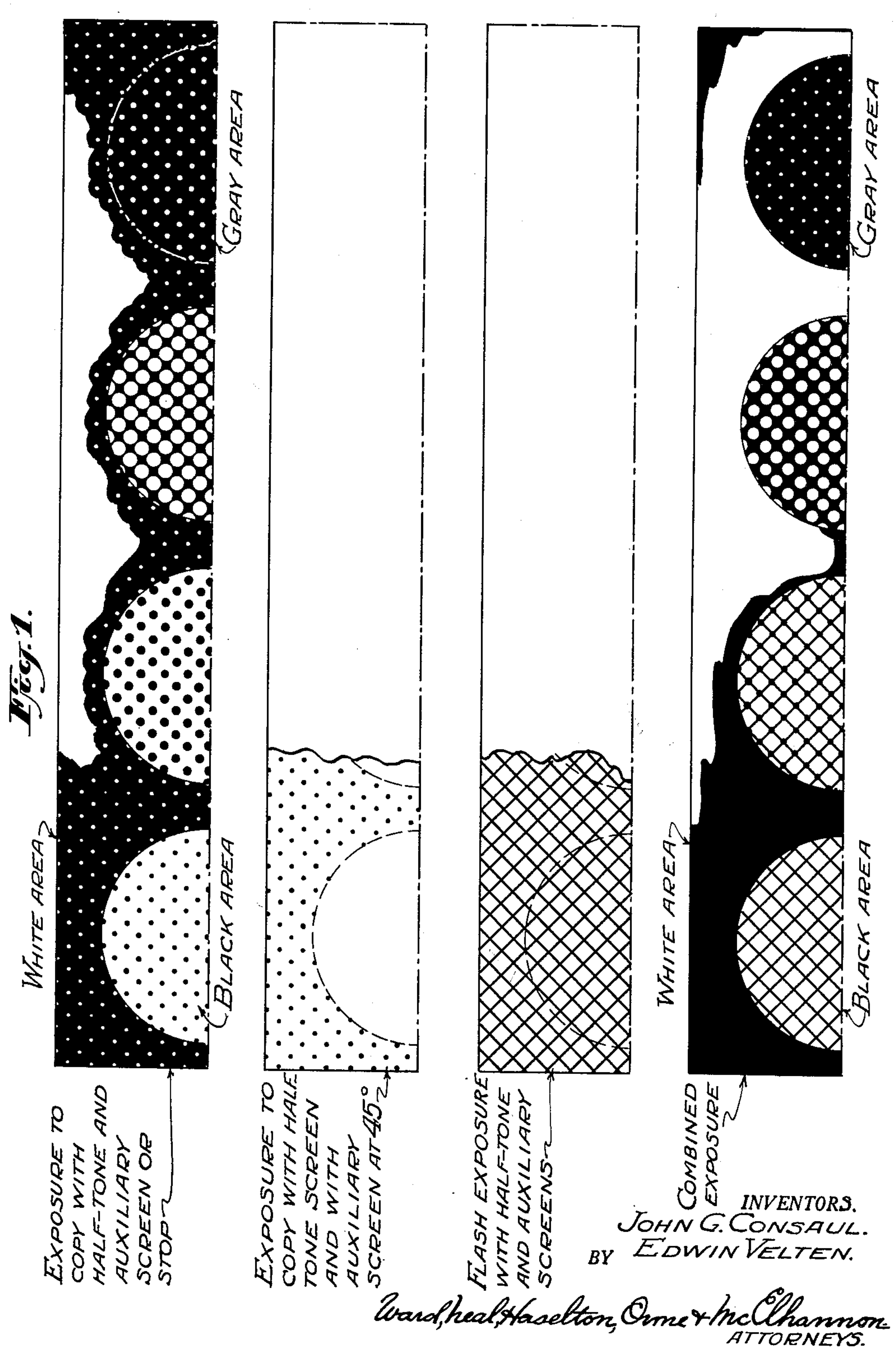
FIG. 1 is a flow sheet of the method.
Figure 2:
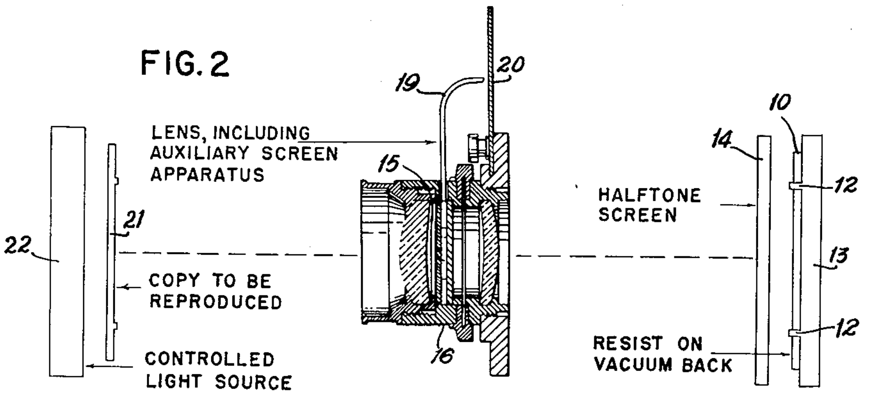
FIG. 2 is a diagrammatic representation, showing the camera lens and auxiliary screening apparatus partly in section, of the step of photographically reproducing the copy directly on the resist.
Figure 3:
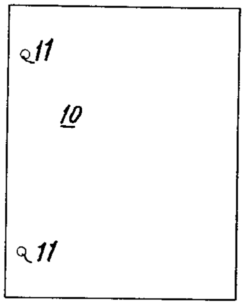
FIG. 3 is a face view of the resist having lug-holes punched in one marginal edge.
Figure 4:
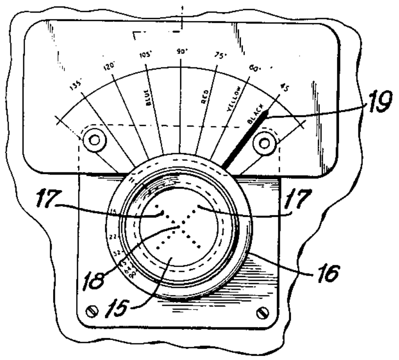
FIG. 4 is a front view of the camera lens and auxiliary screening apparatus with the latter set to 45° angle.

In the practice of our method, we employ a light sensitive silver resist 10, preferably an orthochromatic silver chloro-bromide resist such as is known in the trade as gravure resist film. Two or more lug-holes 11 are punched in a marginal edge of the resist 10. The resist is placed on lugs 12 projecting forward from the vacuum back 13 of a conventional process camera. A conventional half-tone screen 14 is supported in the camera in front of the resist, and an angularly adjustable auxiliary screen 15 is mounted in the lens assembly 16 of the camera. The auxiliary screen 15 is of the type disclosed in our Patent No. 2,703,281, comprising a disk having two series of like members of circular openings 17 arranged in two rows that cross at a right angle about a common center opening 18, which opening is in line with the axis of the lens. An arm or pointer 19 is secured to the disk so that the latter may be adjusted in various angular positions designated by the gradations on the face of the guide plate 20. In FIG. 4, the auxiliary screen 15 is shown as set at an angle of 45°, and in FIG. 5 as set at 90°, for the purpose hereinafter described.

21 indicates the copy or subject matter to be photographed on the resist 10. The copy is set up in front of the camera and is illuminated by a suitable controlled light source 22. The copy may be tone positives, or transparencies, in which case it is desirable to employ a cold cathode light as the source of illumination. Where regular reflective copy is to be photographed on the resist, usual arc lights are used. For best results the light reading at the positive or copy, as read on a light meter, should be 60 candle power. As the light source is connected to a light integrator (not shown), we are able to secure a steady illumination at all times. Any half-tone screen may be used at its prescribed distance. As we employ a steady light source, we are able to use a set chart of exposures to obtain any desired results as set forth, for instance, in the following examples:

*Example 1*

To obtain a resist of full range, directly in the vacuum back of the process camera, a circular half-tone 133 line screen, one to one ratio, is positioned in the camera so that the distance from the screen to the resist will be about $^{15}/_{64}$″. The resist 10 is then placed on the lugs 12 in the vacuum back of the camera, in position to be exposed. The copy or positive 21 is placed in a conventional copy frame or transparency holder. The light source is set at its required reading in readiness to make an exposure.

As the disk 15 of the auxiliary screening apparatus is already positioned in the lens assembly 16, no stops are necessary. As the lines of the conventional half-tone screen 14 form an angle of 45° used for the black printer, we set the pointer 19 of the auxiliary screening apparatus at the same angle, namely: 45° as shown in FIG. 4, and expose for about two minutes. This puts a gradation of dots on the resist corresponding to the picture.

Figure 5:
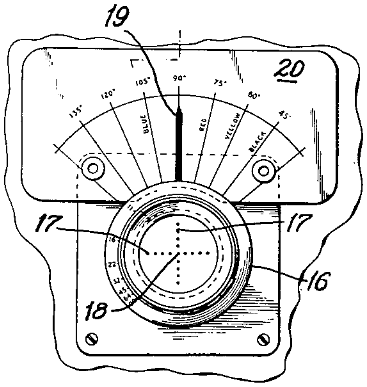
FIG. 5 is a similar view showing the auxiliary screening apparatus set at a 90° angle.
Figure 6:
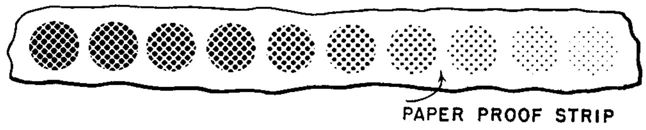
FIG. 6 is a representation of a proof on a strip of paper showing how in the practice of our method the dots or circles are completely silhouetted.
Figure 7:
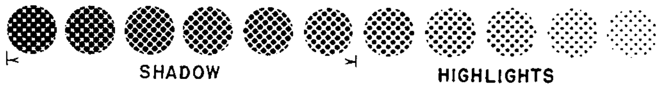
FIGS. 7 and 8 are illustrations indicating that by the practice of our method the appearance, density, and tonal range of the darker dots may be changed.
Figure 8:
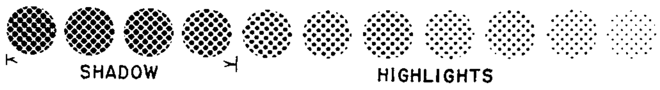
Figure 9:
FIGS. 9 and 10 are similar views showing how by our method the range of the highlight may be controlled.
Figure 10:

We then turn the disk of the auxiliary screening apparatus to a 90° angle, as illustrated in FIG. 5, and expose for one minute. This has the effect to drop out or silhouette all areas not needed, as shown on the proof strip illustrated in FIG. 6. Finally, we return the disk of the auxiliary screening apparatus to its original 45° angle and give a flash exposure through the lens of 30 seconds. This gives us the required screen wall in all solid areas.

As the disk of the auxiliary screening apparatus is always perfectly centered with the half-tone screens, the dots are always in perfect shape.

If the subject is monotone, we remove the resist and develop it, preferably in an automatic developing machine, with a suitable developer for the particular type of resist employed. After washing and drying, we are able to read the resist on a densitometer to check dot formation and density. The proven resist is then transferred to the copper plate or cylinder, using the preformed lug holes 11 to fit the resist on the cylinder or plate in perfect registration. The plate or cylinder is then developed and etched in the usual manner.

Where the copy to be reproduced is in color, we remove the resist from the lugs in the vacuum frame of the camera for development and proceed to expose the blue, red and yellow resists at their proper screen angles, moving the auxiliary screening apparatus to match and then cross said angles. The exposure time and procedure for each color resist is substantially the same as above stated.

*Example 2*

This is to be used in printing on heavy cardboard employed in the manufacture of cartons or packagings, where a wide screen wall is needed to permit a very deep etch in the shadow range.

The method used in this example is substantially the same as that in Example 1, with the exception that a circular half-tone 120 line screen, one to one ratio, is set at a distance of 20⁄64" from screen to resist, and that a flash exposure of one minute is made instead of 30 seconds.

From the foregoing description, it will be seen that our improved method offers considerable economies, and reduces the number of operations required, over traditional methods.

The result of the method is the production of a resist of fully controlled contrast and opacity with all clear and unwanted areas of the tone positive completely silhouetted. The method eliminates the necessity of mounting the resists and of making a screen positive from the tone positive. Also, the double printing of the tone positive and then the screen positive on the carbon tissue or gravure resist film as is now the usual practice is also eliminated.

While we have found that it is desirable to leave the auxiliary screen 15 in the lens 16 at all times, it is to be understood that the auxiliary screen may be withdrawn from the lens and we may initially make an exposure directly through the lens without the auxiliary screen at any indicated diaphragm opening.

As indicated in FIGS. 6 to 10, inclusive, of the drawings, it will be seen that by the practice of our method we are able to vary and control the depth of wall thickness of the cells formed in the copper printing surface and, consequently, to produce dots on the printed picture having a tonal range running from about 95% shadow down to about 5% highlight.

We claim:

1. The method of forming a screened image of copy to be reproduced on light sensitive material with apparatus comprising a copying camera having a lens assembly, a half-tone screen and an auxiliary screen adapted to be mounted in said lens assembly and having a plurality of light openings arranged in a plurality of substantially straight lines that cross at angles equal to the angles between the opaque lines of said half-tone screen, one said screen being adjustable to a position with respect to the other said screen such that said screens are substantially parallel to each other and said lines of said auxiliary screen are substantially parallel to the opaque lines of said half-tone screen, said method comprising exposing said material once to said copy through said half-tone screen and once to a substantially uniform source of light through both said half-tone screen and said lens assembly with said auxiliary screen therein and with said screens in said position.

2. The method of forming a screened image of copy to be reproduced on light sensitive material with apparatus comprising a copying camera having a lens assembly, a half-tone screen and an auxiliary screen adapted to be mounted in said lens assembly and having a plurality of light openings arranged in a plurality of substantially straight lines that cross at angles equal to the angles between the opaque lines of said half-tone screen, said screens being adjustable to two positions with respect to each other and being substantially parallel to each other in both said positions, the lines of said openings of said auxiliary screen being substantially parallel to the opaque lines of said half-tone screen in one of said positions and said lines of said openings in said auxiliary screen being tilted with respect to the opaque lines of said half-tone screen at an angle substantially equal to one-half the angle between said opaque lines in the other of said positions, said method comprising exposing said material at different times to said copy through said half-tone screen, to a substantially uniform source of light through both said screens with said auxiliary screen in said one position and in said lens assembly and to said copy through both screens with said auxiliary screen in said other position and in said lens assembly.

3. The method of forming a screened image of copy to be reproduced on a light sensitive material which comprises exposing said material to said copy through the lens assembly of a copying camera and through a half-tone screen, exposing said material to said copy simultaneously through both said half-tone screen and an auxiliary screen mounted substantially parallel with said half-tone screen and in said lens assembly, said auxiliary screen having a plurality of light openings arranged in two substantially straight lines that cross at right angles and said auxiliary screen also being mounted with the lines of said openings in said auxiliary screen extending at an angle with respect to the opaque lines of said half-tone screen substantially equal to one-half the angle between said opaque lines, and exposing said material to a substantially uniform source of light simultaneously through both said screens with said lines of said openings in said auxiliary screen extending substantially parallel to said opaque lines of said half-tone screen.

4. The method of forming a screened image of copy to be reproduced on a light sensitive material which comprises exposing said material to said copy through the lens assembly of a copying camera and through a half-tone screen, exposing said material to said copy simultaneously through both said half-tone screen and an auxiliary screen mounted substantially parallel with said half-tone screen and in said lens assembly, said auxiliary screen having a plurality of light openings arranged in two substantially straight lines that cross at right angles and said auxiliary screen also being mounted with said lines of openings in said auxiliary screen rotated to a position at a 45° angle with respect to the opaque lines of said half-tone screen, and exposing said material to a substantially uniform source of light simultaneously through both said screens with said lines of openings in said auxiliary screen substantially parallel to said opaque lines.

5. The method of forming a screened image of copy to be reproduced on a light sensitive material which comprises exposing said material to said copy for a predetermined time through the lens assembly of a copying camera and through a half-tone screen, exposing said material to said copy for approximately half of said predetermined time simultaneously through both said half-tone screen and an auxiliary screen mounted substantially parallel with said half-tone screen and in said lens assembly, said auxiliary screen having a plurality of light openings arranged in two substantially straight lines that cross at right angles and said auxiliary screen also being mounted with said lines of openings in said auxiliary screen at an angle with respect to the opaque lines of said half-tone screen equal to one-half the angle between said opaque lines, and exposing said material to a substantially uniform source of light for approximately one-quarter to one-half of said predetermined time simultaneously through both said screens with said lines of said openings in said auxiliary screen substantially parallel to the opaque lines of said half-tone screen.

6. A method of gravure reproduction by photographically forming a resist of the subject or copy to be reproduced directly in a gravure camera having a lens assembly, which comprises illuminating the copy, placing a light sensitive gravure resist film in the camera behind a conventional half-tone screen and an opaque auxiliary screen, said auxiliary screen being mounted in said lens assembly and substantially parallel to said half-tone screen and said auxiliary screen having a plurality of circular openings arranged in two straight lines that cross at right angles and are centered with respect to the half-tone screen, turning the auxiliary screen so that its crossed lines of openings extend substantially parallel to the lines of the half-tone screen and exposing said resist film once to said illuminated copy and once to a uniform source of light, turning the auxiliary screen so that the lines of openings therein extend at an angle of substantially 45° to the lines of the half-tone screen and giving said resist film a second exposure to said copy, transferring said resist film to a gravure printing surface, and finally developing and etching said resist film.

7. A method of forming a gravure resist directly in a gravure camera having a lens assembly, which comprises placing a light sensitive gravure resist in the camera and successively exposing the resist a plurality of times, once to the subject or copy to be reproduced through both a half-tone screen and an opaque auxiliary screen mounted in said lens assembly and substantially parallel to said half-tone screen, said auxiliary screen having a plurality of circular openings arranged in two intersecting straight lines that are centered with respect to the half-tone screen and extend substantially parallel to the lines of the half-tone screen, once to said subject or copy through both said half-tone screen and said auxiliary screen with the lines of openings in said auxiliary screen extending at an angle to the lines of said half-tone screen substantially equal to one-half the angle between the lines of said half-tone screen, and once to a uniform source of light through both said half-tone and auxiliary screens with said lines of openings extending substantially parallel to said lines of said half-tone screen.

8. A method of gravure reproduction by photographically forming a resist of the subject or copy to be reproduced directly in a gravure camera having a lens assembly, which comprises illuminating the copy, placing a light sensitive silver halide resist film in the camera behind a conventional half-tone screen and an opaque auxiliary screen, said auxiliary screen being mounted in said assembly and substantially parallel to said half-tone screen and having a plurality of circular openings arranged in two straight lines that cross at right angles and are centered with respect to the half-tone screen, turning the auxiliary screen to a first position so that its crossed lines of openings extend substantially parallel to the lines of the half-tone screen and exposing said resist film to said copy, turning the auxiliary screen so that the lines of openings therein extend at an angle of substantially 45° to the lines of the half-tone screen and giving said resist film a second exposure to said copy, turning the auxiliary screen to said first position and giving the resist film a flash exposure, transferring the resist film to the gravure printing surface, and finally developing and etching the resist.

References Cited in the file of this patent

UNITED STATES PATENTS

| | | |
|---|---|---|
| 2,182,559 | Henderson | Dec. 5, 1939 |
| 2,239,386 | Hoglund | Apr. 22, 1941 |
| 2,376,596 | Huggins | May 22, 1945 |
| 2,482,638 | Schultz et al. | Sept. 20, 1949 |
| 2,596,115 | Austin | May 13, 1952 |
| 2,703,281 | Consaul et al. | Mar. 1, 1955 |